Patented Sept. 4, 1934

1,972,579

UNITED STATES PATENT OFFICE 1,972,579

ESTERS OF 2-ETHYLBUTANOL-1

Jacob N. Wickert, Charleston, W. Va., assignor to Carbide and Carbon Chemicals Corporation, a corporation of New York No Drawing. Application May 12, 1933, Serial No. 670,755

14 Claims. (Cl. 260—103)

This invention relates to a group of new chemical compounds comprising esters of 2-ethylbutanol-1, having special reference to those esters formed by reaction of 2-ethylbutanol-1 with carboxylic acids.

These new esters are characterized by having a relatively high boiling point and low vapor pressure. They are useful as solvents and plasticizers in the compounding of varnishes, lacquers, and other protective coatings. At ordinary temperatures they are relatively stable and are not miscible with water.

The compounds may be prepared by esterifying 2-ethylbutanol-1 with a carboxylic acid in the presence of catalytic proportions of sulfuric acid, and in a manner adapted to remove continuously the water formed by the reaction. The 2-ethylbutanol-1 may be prepared in any manner known to the art, its chemical constitution and one method of preparation being shown in Berichte, 1890, vol. 23, page 195. As illustrative of my invention, the following examples are given:

Example I

Redistilled 2-ethylbutanol-1 was mixed with glacial acetic acid in the ratio of 1.1 mols of the alcohol to one mol of the acid. To this mixture was added 0.05% by weight of concentrated sulfuric acid. The resulting solution was heated to boiling and distilled under a glass column packed with glass rings. The first distillate separated into two layers, the heavier of which was mostly water. The upper layer was returned to the column and redistilled until no further separation took place. The residue, after removal of the water, was then washed with an aqueous 10% solution of sodium carbonate, and transferred to a low pressure still where it was distilled at 12 mm. of mercury pressure. A small heads cut containing some water and acetic acid was taken, and the main body of the distillate was then collected as one fraction. This material boiled at 54°–56° C. at 12 mm. pressure, and contained 93.5% of 2-ethylbutyl acetate and 6.5% of unreacted 2-ethylbutanol-1. At atmospheric pressure the liquid boiled at 159–163° C. and had a specific gravity of 0.8777 at 20° C.

To prepare the pure ester free of unreacted 2-ethylbutanol-1, a portion of the above product was treated with an excess of acetic anhydride to esterify the remaining ethylbutanol contained in it. This was accomplished by mixing the crude ester with an excess of acetic anhydride and adding to this mixture 0.05% of concentrated sulfuric acid. The solution was then heated to boiling under a fractionating column and allowed to reflux with a small distillate take-off until the still head temperature became constant at 110° C. The take-off was increased and a heads cut was then taken of material boiling up to 130° C. at atmospheric pressure. This proved to consist mainly of acetic acid, mixed with a little water. No ester was found in this cut. The residue in the flask was allowed to cool, washed with a 10% water solution of sodium carbonate, and then with distilled water. The neutralized material was then dried over anhydrous calcium chloride and distilled under reduced pressure. The pure ester boiled at 70° to 71° C. at 30 mm. of mercury pressure, and contained more than 99% 2-ethylbutyl acetate. At atmospheric pressure it boiled at 160°–161° C., and had a specific gravity of 0.8784 at 20° C.

Example II

Redistilled 2-ethylbutanol-1 was mixed with succinic acid in the ratio of 2.2 mols of the alcohol per mol of acid. To this mixture was added a catalytic proportion of sulfuric acid, and enough benzene to serve as a dehydrating agent. This mixture was heated to boiling under a short distilling column connected to a condenser. The condensate was collected in a decanter and the top (benzene) layer was returned to the distilling flask continuously so long as any water separated from the distillate. When no more water could be removed, the benzene was distilled off, the residue was washed with an excess of 10% sodium carbonate solution to remove any acidic substances, and the purified material was distilled at 4 mm. of mercury absolute pressure. After a small heads cut, the main portion of the product distilled at 183°–185° C. at 4 mm. pressure. It had a specific gravity of 0.9558 at 20° C. This was di-2-ethylbutyl succinate, and it was obtained in practically quantitative yields.

Example III 2-ethylbutanol was mixed with phthalic anhydride in the proportions of 2.2 gram mols of the alcohol to 1 gram mol of the acid. To this mixture was added 100 cc. of benzene and one gram of sulfuric acid, and the resulting mixture was reacted and purified in exactly the same manner as indicated in Example II. After a very small heads fraction, the product was obtained boiling at 224°–226° C. at 4 mm. pressure. It had a specific gravity of 1.016 at 20° C. This material was di-2-ethylbutyl phthalate, and it was obtained in a yield corresponding closely to the quantity predicted from theory.

The examples show the preparation of three specific esters, namely 2-ethylbutyl acetate, di-2-ethylbutyl succinate, and di-2-ethylbutyl phthalate. It will be understood, however, that the invention is not limited only to the esters shown by these examples, as any aliphatic or aromatic monocarboxylic or dicarboxylic acid or its anhydride may be equally suitable as a starting product. With the dicarboxylic acid it may be desirable to esterify only one of the acid groups with 2-ethylbutanol-1, and the other may be reacted with another aliphatic alcohol to give a substantially neutral ester.

The invention provides a new group of esters especially suitable as solvents or plasticizers. Those having a boiling point below 300° C. at atmospheric pressure, or 170° C. at 10 mm. of mercury pressure are useful as solvents in several types of compositions where a neutral substance of high solvent power is required. The esters having boiling points higher than the above temperatures are very useful as plasticizers and stabilizers in conjunction with both natural and synthetic resins.

I claim:—

1. As chemical compounds, the carboxylic acid esters of 2-ethylbutanol-1.
2. As chemical compounds, the monocarboxylic acid esters of 2-ethylbutanol-1.
3. As chemical compounds, the polycarboxylic acid esters of 2-ethylbutanol-1.
4. As chemical compounds, the aliphatic monocarboxylic acid esters of 2-ethylbutanol-1.
5. As chemical compounds, the aliphatic dicarboxylic acid esters of 2-ethylbutanol-1.
6. As chemical compounds, the aromatic dicarboxylic acid esters of 2-ethylbutanol-1.
7. As a chemical compound, an acetic acid ester of 2-ethylbutanol-1.
8. As a chemical compound, a succinic acid ester of 2-ethylbutanol-1.
9. As a chemical compound, a phthalic acid ester of 2-ethylbutanol-1.
10. As a chemical compound, 2-ethylbutyl acetate having a boiling point of about 160° C. at atmospheric pressure, and a specific gravity of about 0.8784 at 20° C.
11. As a chemical compound, di-2-ethylbutyl succinate having a boiling point of about 183° C. to 185° C. at 4 mm. of mercury pressure, and a specific gravity of about 0.9558 at 20° C.
12. As a chemical compound, di-2-ethylbutyl phthalate having a boiling point of about 224° C. to 226° C. at 4 mm. of mercury pressure, and a specific gravity of about 1.016 at 20° C.
13. A process for making carboxylic acid esters which comprises reacting the acid with 2-ethylbutanol-1 in the presence of catalytic proportions of sulfuric acid.
14. A process for making dicarboxylic acid esters which comprises reacting the acid with 2-ethylbutanol-1 in the presence of catalytic proportions of sulfuric acid, whereby at least one carboxyl hydrogen is replaced by a 2-ethylbutanol group.

JACOB N. WICKERT.